United States Patent
Diard et al.

(10) Patent No.: US 7,616,207 B1
(45) Date of Patent: Nov. 10, 2009

(54) GRAPHICS PROCESSING SYSTEM INCLUDING AT LEAST THREE BUS DEVICES

(75) Inventors: Franck R. Diard, Mountain View, CA (US); Michael B. Diamond, Los Gatos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 434 days.

(21) Appl. No.: 11/114,475

(22) Filed: Apr. 25, 2005

(51) Int. Cl.
*G06T 1/20* (2006.01)
*G06F 15/16* (2006.01)
*G06F 15/80* (2006.01)

(52) U.S. Cl. .................. 345/506; 345/502; 345/503; 345/504; 345/505

(58) Field of Classification Search ................ 345/520, 345/502–506; 710/300
See application file for complete search history.

(56) References Cited

U.S. PATENT DOCUMENTS

| | | | | |
|---|---|---|---|---|
| 5,293,480 A | * | 3/1994 | Miller et al. ............... | 345/502 |
| 5,434,967 A | * | 7/1995 | Tannenbaum et al. ....... | 345/506 |
| 5,440,682 A | * | 8/1995 | Deering ...................... | 345/503 |
| 5,790,130 A | | 8/1998 | Gannett | |
| 5,841,444 A | | 11/1998 | Mun | |
| 6,023,281 A | | 2/2000 | Grigor et al. | |
| 6,078,339 A | | 6/2000 | Meinerth et al. | |
| 6,191,800 B1 | | 2/2001 | Arenburg et al. | |
| 6,259,461 B1 | | 7/2001 | Brown | |
| 6,317,133 B1 | | 11/2001 | Root et al. | |
| 6,362,818 B1 | | 3/2002 | Gardiner et al. | |
| 6,445,391 B1 | | 9/2002 | Sowizral et al. | |
| 6,469,746 B1 | | 10/2002 | Maida | |
| 6,473,086 B1 | | 10/2002 | Morein et al. | |
| 6,496,187 B1 | * | 12/2002 | Deering et al. ............. | 345/419 |
| 6,570,571 B1 | | 5/2003 | Morozumi | |
| 6,621,500 B1 | * | 9/2003 | Alcorn et al. ............... | 345/629 |
| 6,662,257 B1 | * | 12/2003 | Caruk et al. ................ | 710/305 |
| 6,670,958 B1 | * | 12/2003 | Aleksic et al. ............. | 345/502 |
| 6,724,390 B1 | | 4/2004 | Dragony et al. | |
| 6,747,654 B1 | | 6/2004 | Laksono et al. | |
| 6,781,590 B2 | | 8/2004 | Katsura et al. | |
| 2001/0024205 A1 | * | 9/2001 | Kishi et al. ................. | 345/520 |

(Continued)

FOREIGN PATENT DOCUMENTS

EP  0571969  5/2003

OTHER PUBLICATIONS

PCI Express Base Specification Revision 1.0 (Apr. 29, 2002).*

(Continued)

*Primary Examiner*—Xiao M Wu
*Assistant Examiner*—Tize Ma
(74) *Attorney, Agent, or Firm*—Townsend and Townsend and Crew LLP

(57) ABSTRACT

Multichip graphics processing subsystems include at least three distinct graphics devices (e.g., expansion cards) coupled to a high-speed bus (e.g., a PCI Express bus) and operable in a distributed rendering mode. One of the graphics devices provides pixel data to a display device, and at least one of the other graphics devices transfers the pixel data it generates to another of the devices via the bus to be displayed. Where the high-speed bus provides data transfer lanes, allocation of lanes among the graphics devices can be optimized.

3 Claims, 7 Drawing Sheets

U.S. PATENT DOCUMENTS

| | | | |
|---|---|---|---|
| 2002/0030694 A1* | 3/2002 | Ebihara et al. | 345/634 |
| 2003/0128216 A1 | 7/2003 | Walls et al. | |
| 2004/0075623 A1 | 4/2004 | Hartman | |
| 2005/0012749 A1 | 1/2005 | Gonzalez et al. | |
| 2005/0041031 A1* | 2/2005 | Diard | 345/505 |
| 2005/0088445 A1 | 4/2005 | Gonzalez et al. | |
| 2007/0076006 A1* | 4/2007 | Knepper et al. | 345/520 |

OTHER PUBLICATIONS

Whitman, "Dynamic Load Balancing for Parallel Polygon Rendering" IEEE Computer Graphics and Applications, IEEE Inc. New York, U.S. vol. 14, No. 4, pp. 41-48, Jul. 1, 1994.

* cited by examiner

GRAPHICS PROCESSING SYSTEM INCLUDING AT LEAST THREE BUS DEVICES

BACKGROUND OF THE INVENTION

The present invention relates in general to graphics processing systems, and in particular to graphics processing subsystems that include at least three bus devices.

Graphics processing subsystems are designed to render realistic animated images in real time, e.g., at 30 or more frames per second. These subsystems are most often implemented on expansion cards that can be inserted into appropriately configured slots on a motherboard of a computer system and generally include a dedicated graphics processing unit (GPU) and dedicated graphics memory. The typical GPU is a highly complex integrated circuit device optimized to perform graphics computations (e.g., matrix transformations, scan-conversion and/or other rasterization techniques, texture blending, etc.), write the resulting pixels to the graphics memory, and deliver the pixels in real time to a display device. The GPU is a "slave" processor that operates in response to commands received from a driver program executing on a "master" processor, generally the central processing unit (CPU) of the system.

To meet the demands for realism and speed, some GPUs include more transistors than typical CPUs. In addition, graphics memories have become quite large in order to improve speed by reducing traffic on the system bus; some graphics cards now include as much as 256 MB of memory. But despite these advances, a demand for even greater realism and faster rendering persists.

As one approach to meeting this demand, some manufacturers have begun to develop "multi-chip" (or multi-processor) graphics processing subsystems in which two or more GPUs, usually on the same card, operate in parallel. Parallel operation substantially increases the number of rendering operations that can be carried out per second without requiring significant advances in GPU design. To minimize resource conflicts between the GPUs, each GPU is generally provided with its own dedicated memory area, including a display buffer to which the GPU writes pixel data it renders.

In a multi-chip system, two or more GPUs can be operated to render images cooperatively for the same display device; in this "distributed" rendering mode, rendering tasks are distributed among the GPUs. Tasks may be distributed in various ways. For example, in a "split frame rendering" (SFR) mode, each GPU is instructed to render pixel data for a different portion of the displayable image, such as a number of lines of a raster-based display. The image is displayed by scanning out the pixel data from each GPU's display buffer in an appropriate sequence. As another example, in an "alternate frame rendering" (AFR) mode, each GPU is instructed to render pixel data for a different image in a temporal sequence (e.g., different frames of an animated image such as a 3D video game). In this mode, a smooth animation speed of about 30 frames per second can be provided by two GPUs that each render images at 15 Hz.

Multi-chip graphics systems present a variety of problems, among which is providing the pixel data generated by different chips to a display device in a coherent manner. Existing display devices are generally configured to receive data for each screen pixel serially through one interface. Consequently, the multichip graphics system generally needs to route all of the pixel data to a single path for delivery. Where the different graphics processors are located on different bus devices (e.g., different expansion cards), at most one of the devices can be connected to the display interface. Other devices would need to transfer their data to the directly connected card. Efficient techniques for making such data transfers are therefore desirable.

BRIEF SUMMARY OF THE INVENTION

Embodiments of the present invention provide multichip graphics processing subsystems in which at least three distinct graphics devices are coupled to a bus and the devices are operable in a distributed rendering mode. Each graphics device may be, e.g., a different expansion card that includes at least one graphics processor; in some embodiments, a high-speed bus protocol such as PCI Express (PCI-E) is used. At least one of the devices is configured to transfer the pixel data it generates to another of the devices via the bus.

According to one aspect of the present invention, a graphics processing subsystem includes at least three graphics devices each adapted to be coupled to a system bus. The at least three graphics devices include a first graphics device configured to compute pixel data for a first portion of an image, a second graphics device configured to compute pixel data for a second portion of the image, and a third graphics device configured to compute pixel data for a third portion of the image. A dedicated pixel bus connects the first and second graphics devices. The first graphics device is further configured to supply pixel data from either of the first or second graphics devices to a display device, and the first, second and third graphics devices are further configured such that at least a portion of the pixel data for the third portion of the image is transferred from the third graphics device to a target one of the first and second graphics devices via the system bus. Each graphics device may be, e.g., an expansion card connectable to the system bus.

In some embodiments, the system bus has a number of lanes for transferring data and wherein a fixed number M of the lanes of the system bus are allocated to the graphics processing subsystem; for instance, the system bus can be a PCI Express bus. The M lanes allocated to the graphics processing system can be further allocated among the at least three graphics devices such that a data transfer path on the system bus between the third graphics device and the target one of the first and second graphics devices includes a larger number of lanes than a data transfer path on the system bus between the first graphics device and the second graphics device.

In some embodiments, the first, second, and third graphics devices are further configured to transfer a first subset of the pixel data for the third portion of the image to the first graphics device via the system bus and to transfer a second subset of the pixel for the third portion of the image to the second graphics device via the system bus. For instance, the third graphics device can be configured to transfer, by a push operation, a first subset of the pixel data for the third portion of the image to the first graphics device and the second graphics device can be configured to transfer, by a pull operation, a second subset of the pixel data for the third portion of the image from the third graphics device to the second graphics device.

Some embodiments also include a fourth graphics device configured to compute pixel data for a fourth portion of the image. The graphics devices can be further configured such that all of the pixel data for the third portion of the image is transferred from the third graphics device to the target one of the first and second graphics devices via the system bus and all of the pixel data for the fourth portion of the image is transferred from the fourth graphics device to the other of the first and second graphics devices via the system bus.

According to another aspect of the present invention, a graphics processing subsystem includes at least three graphics devices each adapted to be coupled to a system bus. A first graphics device is configured to compute pixel data for a first portion of an image, a second graphics device is configured to compute pixel data for a second portion of the image, and a third graphics device configured to compute pixel data for a third portion of the image. The first graphics device is further configured to supply pixel data from either of the first or second graphics devices to a display device, and the first, second, and third graphics devices are further configured such that the pixel data for the second and third portions of the image are transferred from the second and third graphics devices to the first graphics device via the system bus. For instance, the third graphics device can be further configured to transfer, by a push operation, the pixel data for the third portion of the image to the first graphics device, and the first graphics device can be further configured to transfer, by a pull operation, the pixel data for the second portion of the image from the second graphics device to the first graphics device.

In embodiments where the system bus has a number of lanes for transferring data and a fixed number M of the lanes of the system bus are allocated to the graphics processing subsystem, the M lanes can be allocated among the at least three graphics devices such that a data transfer path on the system bus between the third graphics device and the first graphics device and a data transfer path on the system bus between the second graphics device and the first graphics device each include the same number of lanes.

According to a further aspect of the present invention, in a computer system, a method for rendering an image using multiple graphics devices includes generating pixel data for a first portion of an image using a first graphics device coupled to a system bus, generating pixel data for a second portion of an image using a second graphics device coupled to the system bus, and generating pixel data for a third portion of an image using a third graphics device coupled to the system bus. At least a portion (in some embodiments, all) of the pixel data for the third portion of the image is transferred from the third graphics device to a target one of the first and second graphics devices via the system bus. The pixel data for at least the second portion of the image is transferred from the second graphics device to the first graphics device, and the pixel data for the first, second and third portions is transferred from the first graphics device to the display device.

In some embodiments, the pixel data transferred from the second graphics device to the first graphics device is transferred via a dedicated pixel bus that connects the first and second graphics devices. Any or all of the pixel data for the third portion of the image can be transferred to the first graphics device via the system bus, or it can be transferred to the second graphics device vial the system bus, then transferred from the second graphics device to the first graphics device via the dedicated pixel bus.

The following detailed description together with the accompanying drawings will provide a better understanding of the nature and advantages of the present invention.

DETAILED DESCRIPTION OF THE INVENTION

Embodiments of the present invention provide multichip graphics processing subsystems in which at least three distinct bus devices are operable in a distributed rendering mode. Each bus device may be, e.g., a different expansion card that includes at least one graphics processor; in some embodiments, a high-speed bus protocol such as PCI Express (PCI-E) is used. At least one of the devices is configured to transfer its pixel data for display to another of the devices via the bus.

Figure 1:
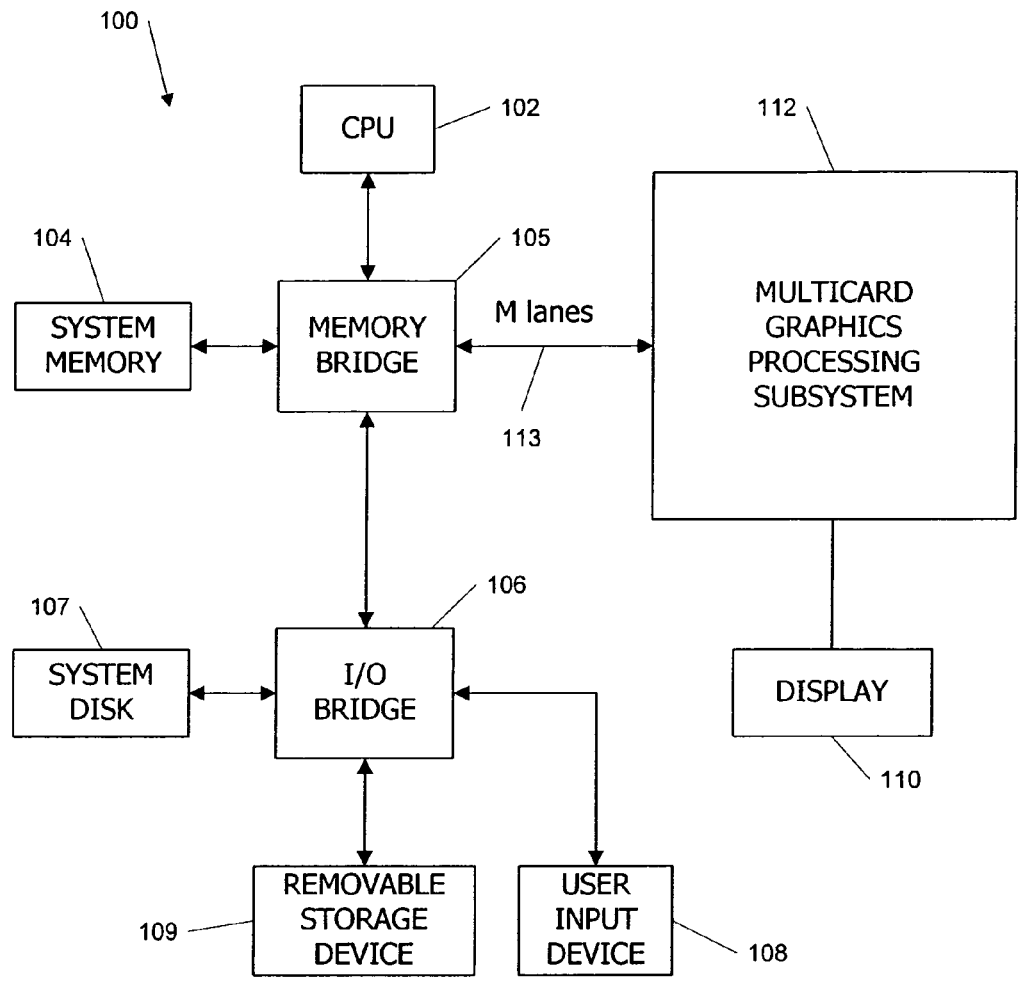
FIG. 1 is a block diagram of a computer system according to an embodiment of the present invention.

FIG. 1 is a block diagram of a computer system 100 according to an embodiment of the present invention. Computer system 100 includes a central processing unit (CPU) 102 and a system memory 104 communicating via a memory bridge unit 105. Memory bridge unit 105 is coupled to an I/O bridge unit 106 via a high-speed bus 103, such as a PCI Express (PCI-E) bus. User input is received from one or more user input devices 108 (e.g., keyboard, mouse) via I/O bridge unit 106. A system disk 107 and other components, such as one or more removable storage devices 109 (e.g., floppy disk drive, compact disk (CD) drive, and/or DVD drive), may also be coupled to I/O bridge unit 106. Visual output is provided on a pixel based display device 110 (e.g., a conventional CRT or LCD based monitor) operating under control of a multicard graphics processing subsystem 112 coupled to memory bridge 105 via a high-speed bus 113, such as a PCI-E bus.

In one embodiment, the high-speed bus 113 between memory bridge unit 105 and graphics processing subsystem 112 and the high-speed bus 103 between memory bridge unit 105 and I/O bridge unit 106 are implemented as a PCI Express (PCI-E) bus that may also be used to connect other devices to the bridge units 105, 106. As is known in the art, the PCI-E bus supports a number of data transfer lanes, and the lanes can be allocated equally or unequally among the devices connected to the bus. As shown in FIG. 1, M lanes are advantageously allocated for communication between memory bridge 105 and graphics processing subsystem 112. The value of M is determined by the design of memory bridge 105 and might be, e.g., M=24 or M=32. The M lanes can be further allocated to specific devices within graphics subsystem 112 as described below. In other embodiments, buses other than PCI-E may be used.

Multicard graphics subsystem 112 includes at least three discrete graphics processing devices, with each device being separately connected to bus 113 and allocated a different subset of the M available lanes. In some embodiments, the discrete devices take the form of expansion cards designed to be connected into a motherboard implementing bus 113; such cards may be of generally conventional design and equipped with suitable connectors. While expansion cards are used herein for illustration, it is to be understood that expansion cards are not required. For instance, one or more of the graphics devices may be integrated with a chipset component, directly mounted on a motherboard, or the like.

With the exception of multicard graphics subsystem 112, embodiments of which are described further below, the components of system 100 may be generally conventional in design, and a detailed description of these components is omitted as not being critical to understanding the present invention.

During operation of system 100, CPU 102 executes various programs that are (temporarily) resident in system memory 104. In one embodiment, these programs include operating system and application programs of generally conventional design that may generate graphics data and invoke rendering functions of graphics processing subsystem 112 and/or supply pixel data directly to graphics processing subsystem 112.

CPU 102 also advantageously executes a graphics driver program that enables communication with graphics processing subsystem 112. The graphics driver program advantageously implements one or more standard application program interfaces (APIs), such as Open GL, or Microsoft D3D for communication with graphics processing subsystem 112; any number or combination of APIs may be supported, and in some embodiments separate driver programs are provided to implement different APIs. By invoking appropriate API function calls, operating system programs and/or application programs executing on CPU 102 are able to instruct the graphics driver program to transfer geometry data or pixel data to graphics processing subsystem 112, to control operations of graphics processing subsystem 112, and so on.

In response to API function calls, the graphics driver writes commands to a command stream that is delivered to graphics processing subsystem 112 as described below and may also transmit data to internal memories (not shown in FIG. 1) of graphics processing subsystem 112. The specific commands and/or data transmitted by the driver program in response to an API function call may vary depending on the implementation of the processors in graphics processing subsystem 112, and the driver program may also transmit commands and/or data implementing additional functionality (e.g., special visual effects) not controlled by the operating system or application programs.

Figure 2:
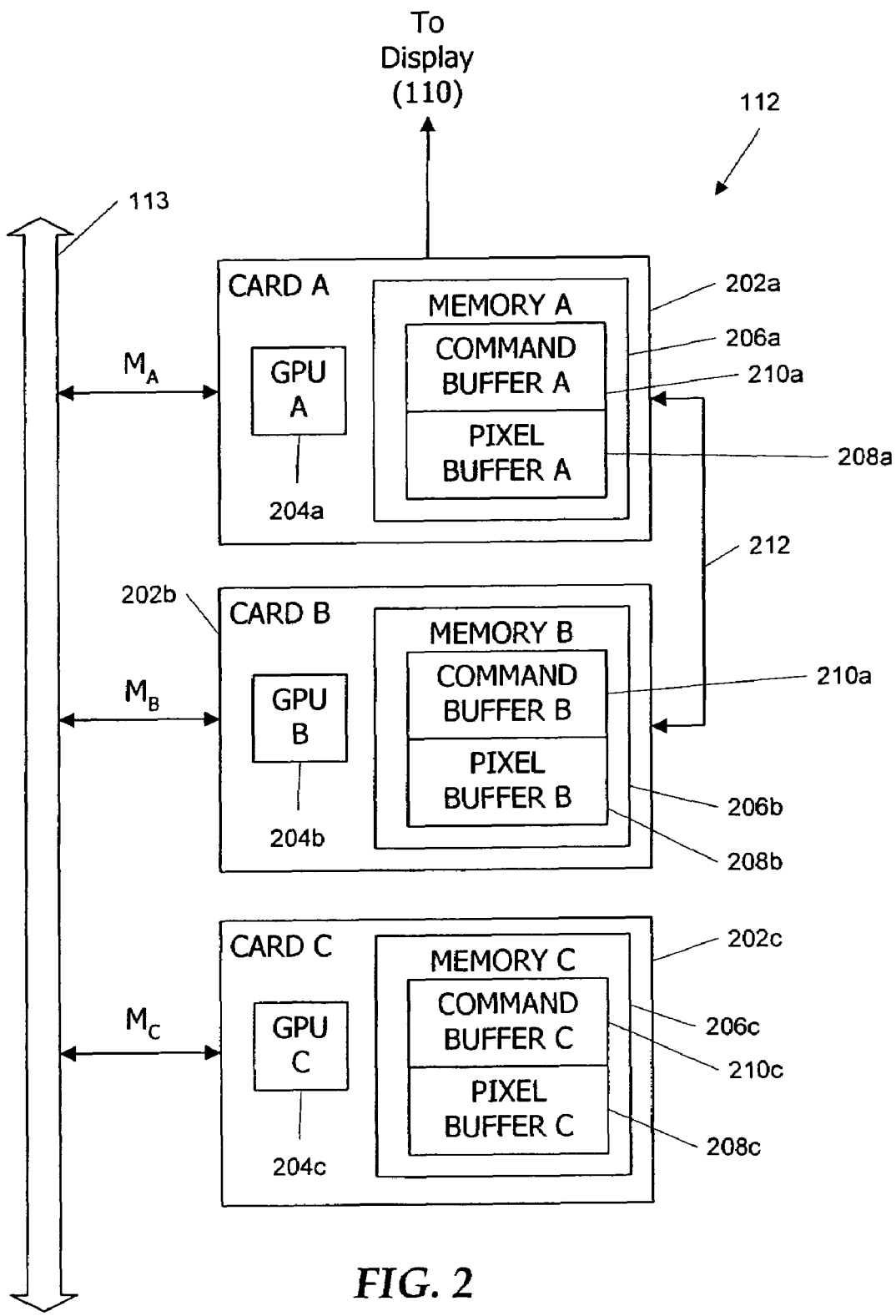
FIG. 2 is a block diagram of a multicard graphics processing subsystem with three graphics cards according to an embodiment of the present invention.

Embodiments of multicard graphics processing subsystem 112 will now be described. Referring to FIG. 2, there is shown a block diagram of a multicard graphics processing subsystem 112 according to a first embodiment of the present invention. Graphics processing subsystem 112 includes three (or more) graphics cards 202, each of which is a separate device connected to bus 113. (Herein, multiple instances of like objects are identified by the same reference number, with alphabetic instance identifiers appended where appropriate.) The M lanes of bus 113 are allocated among graphics cards 202, with $M_A$ lanes allocated to card 202a, $M_B$ lanes to card 202b, and $M_C$ lanes to card 202c. Optimal selection of $M_A$, $M_B$, and $M_C$ is described below.

Each graphics card 202 includes a graphics processing unit (GPU) 204 and a graphics memory 206 that includes a pixel buffer 208. All graphics cards 202 may be of identical design or different design as desired. GPUs 204 and memories 206 may be implemented, e.g., using one or more integrated circuit devices such as programmable processors, application specific integrated circuits (ASICs), and memory devices.

Each graphics memory 206 contains various physical or logical subdivisions, including a pixel buffer 208 and a command buffer 210. Each pixel buffer 208 stores pixel data for an image (or for a part of an image) generated by the corresponding GPU 204 or, in some instances, pixel data generated by various processes executing on CPU 102 and provided directly to pixel buffer 208. Each pixel buffer 208 may be double buffered so that while data for a first image is being read for display from a front frame buffer, data for a second image can be written to a back frame buffer without affecting the currently displayed image. Double-buffering techniques and other techniques known in the art may be used to manage the pixel buffer 208 for each card 202. Reading out of pixel data is described below.

Each command buffer 210 is used to queue commands received from a graphics driver program executing on CPU 102 for execution by GPU 204. The command buffer is advantageously implemented as a first in, first out buffer (FIFO) that is written by CPU 102 and read by GPU 204. Reading from and writing to the command buffer can occur asynchronously, using techniques known in the art, and different GPUs 204 may operate asynchronously relative to each other as well as relative to CPU 102. Where synchronization is desired (e.g., when swapping the front and back frame buffers of a double-buffered pixel buffer), suitable synchronization commands may be inserted into the command stream, or hardware components may be provided to supply suitable synchronization signals.

In some embodiments, some or all of the commands may include sub-device masks that control whether selected portions of the command stream are executed or not executed by each one of GPUs 204. All of the command stream may be written to every command buffer, and sub-device masks may be operative during command execution, with a suitable sub-device mask acting as an instruction to one or more of GPUs 204 to skip execution of certain commands. Thus, command buffers could also be implemented in a single memory accessible to all GPUs 204, e.g., in system memory.

Other portions of graphics memories 206 may be used to store data required by GPUs 204 (such as texture data, color lookup tables, etc.), executable program code for GPUs 204, and so on, as is known in the art.

Each GPU 204 includes a rendering module (not shown) that provides fixed-function and/or programmable circuitry configured to perform various tasks related to generating pixel data for an image from 2-D or 3-D scene data (e.g., geometry data) supplied from various programs executing on CPU 102 (FIG. 1) via PCI-E bus 113, interacting with pixel buffer 208 to store and update pixel data, and the like. GPUs 204 for different graphics cards 202 are advantageously configured such that a given rendering instruction can be executed by any GPU 204 in subsystem 112 with substantially identical results, although this is not required. The particular configuration of the rendering modules may be varied as desired, and a detailed description is omitted as not being critical to understanding the present invention.

Each GPU 204 also includes a scanout module (not shown in FIG. 2) that delivers pixel data from its local pixel buffer 208 for display on display device 110. Pixel data is advantageously delivered to display device 110 by GPU 204a or another component of card 202a, with cards 202b and 202c delivering their pixel data to display device 110 via card 202a as described below. In one embodiment, the scanout modules in GPUs 204 operate isochronously, scanning out frames of pixel data at a prescribed refresh rate (e.g., 80 Hz) regardless of any other activity that may be occurring in graphics processing subsystem 112 or elsewhere in system 100. In some embodiments, the prescribed refresh rate can be a user selectable parameter, and the scanout order may be varied as appropriate to the display format (e.g., interlaced or progressive scan). The scanout modules may also perform pixel manipulations, such as adjusting color values for particular display hardware and/or generating composite screen images by combining the pixel data from pixel buffers 208 with data for a video or cursor overlay image or the like, which may be obtained, e.g., from portions of graphics memories 206 other than pixel buffers 208, from system memory 104 (shown in FIG. 1), or from another data source. Examples of scanout operations are known in the art, and a detailed description is omitted as not being critical to understanding the present invention.

In some embodiments, the GPUs 204 on graphics cards 202 are operated in a distributed rendering mode. In one such mode, referred to herein as "split-frame rendering" (SFR), different GPUs 204 operate in parallel to render different portions of the same image. The image portions may correspond to horizontal bands, vertical bands, or other divisions as desired. In preferred embodiments, each GPU 204 allocates a pixel buffer 208 in its memory 206 that is large enough to store entire frames of data but only fill pixels corresponding to the portion of the image being rendered by that GPU 204.

Delivery of pixel data for the various image portions to display device 110 in a distributed rendering mode will now be described. In one embodiment, graphics card 202a is coupled to deliver pixel data display device 110, and the remaining graphics cards 202b, 202c are configured to deliver pixel data for their respective portions of the image to graphics card 202a. For example, as described in above-referenced application Ser. No. 10/642,905, graphics cards 202b and 202c may each perform a block transfer (Blt) of pixel data to graphics card 202a using a conventional DMA Blt or other suitable data transfer operation.

In another embodiment, a dedicated interface, referred to herein as a "pixel bus" 212 may connect a pair of graphics cards for purposes of transmitting pixel data and optionally other information between the connected cards. Pixel bus 212, which may be implemented using any suitable electronic devices, is distinct from bus 113. For instance, pixel bus 212 can be implemented as a printed circuit board (PCB), ribbon cable, or the like with suitable connectors disposed thereon that couple to corresponding connector receptacles in the graphics cards 202. In one embodiment, pixel bus 212 connects graphics cards 202a and 202b. A further pixel bus (not shown in FIG. 2) might be provided to connect graphics cards 202b and 202c, thereby providing a "daisy chain" connection through which pixel data can flow from graphics card 202c to graphics card 202b and from there to graphics card 202a.

Figure 3:
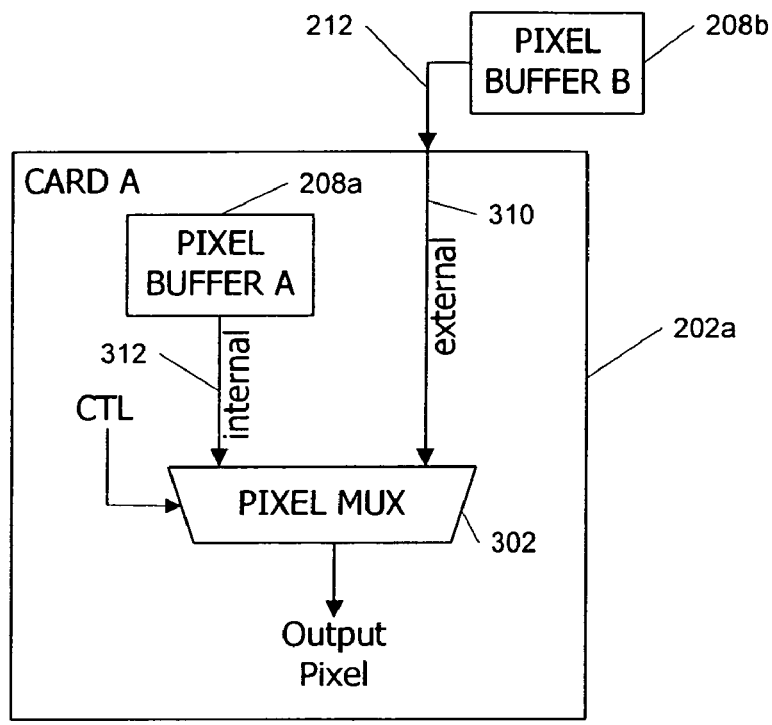
FIG. 3 is a block diagram of a daisy-chain scanout path implemented in a graphics card for a multicard graphics system according to an embodiment of the present invention.

Along the daisy chain, each graphics card 202 advantageously includes control logic, which may be implemented in the respective scanout modules of GPUs 204 or as a discrete component on each graphics card 202, for selecting between a pixel generated internally (i.e., by that GPU 204) and a pixel received via the pixel bus 212. FIG. 3 is a block diagram of daisy-chain control logic implemented in card 202a. A multiplexer (pixel mux) 302 receives two candidate pixels and selects between them in response to a control signal (CTL). One of the candidate pixels is an "internal" pixel supplied by pixel buffer 208a of card 202a. The other candidate is an "external" pixel supplied by pixel buffer 208b of card 202b via pixel bus 212.

In operation, the scanout module of GPU 204b on card 202b operates as if it were delivering pixels from its pixel buffer 208b directly to a display device, except that the final pixel value generated by card 202b is delivered via pixel bus 212 to an external pixel path 310 in card 202a. In parallel, GPU 204a of card 202a operates to deliver pixels from pixel buffer 208a to an internal pixel path 312. Pixel bus 212, external pixel path 310, and/or internal pixel path 312 may include FIFOs or other timing circuitry to synchronize pixels originating from pixel buffer 208a and pixels originating from pixel buffer 208b so that candidate pixels corresponding to the same screen location arrive at the inputs of pixel mux 302 on the same clock cycle. Synchronously with the arrival of the candidate pixels at pixel mux 302, control signal CTL is driven to select the appropriate one of the candidate pixels to be delivered to the display device. Control signal CTL is advantageously driven based on the current configuration of graphics processing system 112, in particular which graphics card 202 is responsible for generating each pixel of the displayed image. Control signal CTL may change between selecting internal and external pixels on a per-pixel, per-scanline or other basis as desired.

Referring again to FIG. 2, in the embodiment shown, card 202c is not connected to card 202b or card 202a via a pixel bus; thus, all communications between card 202c and card 202a or card 202b takes place via PCI-E bus 113. Prior to scanout, pixel data generated by card 202c is advantageously transferred via PCI-E bus 208 to either pixel buffer 208a of card 202a or pixel buffer 208b of card 202b; in some instances, some pixel data from pixel buffer 208c may be transferred to pixel buffer 208a while other pixel data from pixel buffer 208c is transferred to pixel buffer 208b. A conventional block transfer (Blt) operation is advantageously used to transfer pixels from pixel buffer 208c of card 202c to pixel buffer 208a of card 202a and/or pixel buffer 208b of card 202b. The Blt operation may be implemented as a "push" (e.g., a write operation) initiated by card 202c or a "pull" (e.g., a read operation) initiated by card 202a or card 202b. Specific examples are described below. It is to be understood that other techniques and devices may be used to forward pixel data from one graphics card to another and to deliver pixels to a display device.

Figure 4:
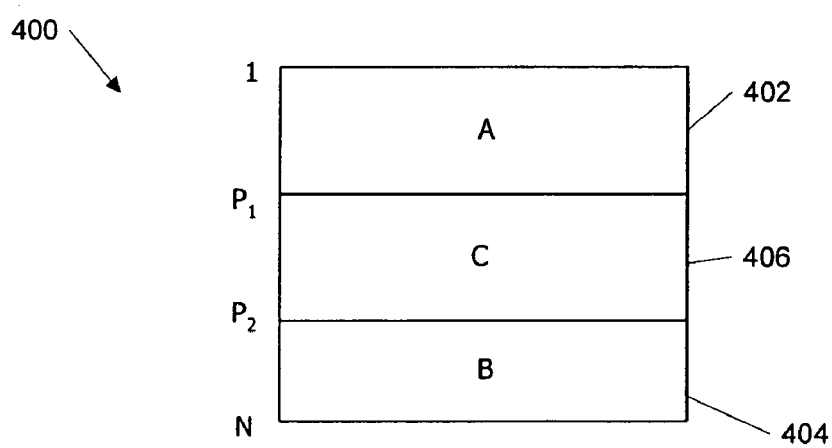
FIG. 4 is an illustration of a display area for which an image is to be generated using three-way split frame rendering (SFR) according to an embodiment of the present invention.

In embodiments of the present invention, graphics processing subsystem 112 advantageously implements SFR, with different portions of the image being rendered by different GPUs 204. By way of example, FIG. 4 is an illustration of a display area 400 for which an image is to be generated using SFR. Display area 400 represents a pixel array consisting of some number N of scan lines, each of which includes some number of pixels. Letter "A" denotes that GPU 204a computes pixel data for a top portion 402 (scan lines 1 to $P_1$) of display area 400, letter "B" that GPU 204b computes pixel data for a bottom portion 404 (scan lines $P_2+1$ to N), and letter "C" that GPU 204c computes pixel data for a middle portion 406 (scan lines $P_1+1$ to $P_2$).

In some embodiments, the values of $P_1$ and $P_2$ can be dynamically adjusted as long as $1<P_1<P_2<N$. Dynamic adjustment advantageously allows adaptive load balancing so that GPUs 202a, 202b, 202c require approximately equal time to render their respective portions 400, 404, 406 of each image. Examples of techniques for adaptive load balancing that may be applied in embodiments of the present invention are described in above-referenced application Ser. No. 10/642,905. In other embodiments, $P_1$ and $P_2$ could be fixed.

The division of the display area illustrated in FIG. 4 is illustrative and may be modified or varied. For example, the assignment of GPUs to image portions may be permuted (e.g., any of the GPUs might be used to render top portion 402). Further, while dividing the display area into horizontal bands as shown in FIG. 4 is generally convenient for systems with raster-scanning display devices, other divisions (e.g., into vertical bands) might be used instead.

As described above, GPUs 204 generate (render) pixel data for their respective portions of an image and write that data to their respective pixel buffers 208. In one embodiment, each GPU 204 allocates a pixel buffer 208 that is large enough to accommodate all of the pixel data for display area 400 but only actually stores pixel data in the buffer locations that correspond to pixels it renders. Thus, data in corresponding locations in the pixel buffers 208 of different cards 202 advantageously corresponds to the same pixel.

To deliver the pixel data to a display device, pixel data for middle portion 406 of display area 400 is transferred from pixel buffer 208c of graphics card 202c to pixel buffer 208a or 208b via PCI-E bus 113. Once the pixel data is transferred to pixel buffer 208a or 208b it can be processed through pixel mux 302 (FIG. 3) as if it had been generated by GPU 204a or 204b.

Figure 5A:
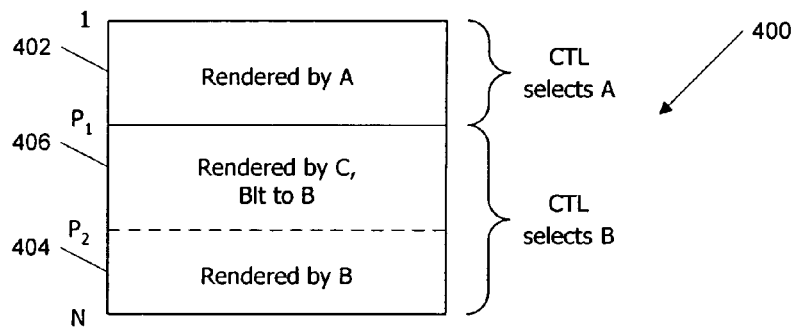
FIGS. 5A and 5B illustrate pixel delivery techniques that may be employed in an embodiment of the present invention where the display area is divided as shown in FIG. 4.
Figure 5B:
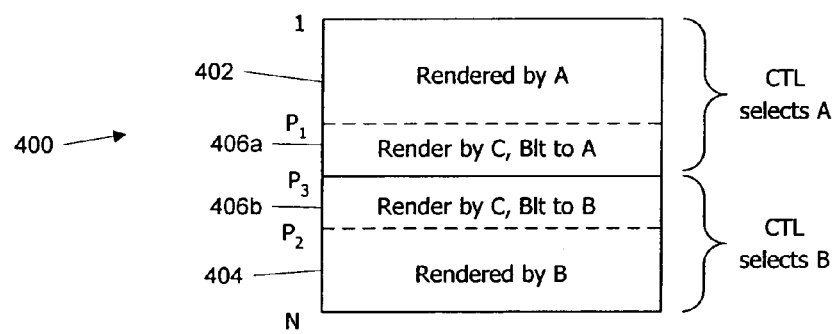

FIGS. 5A and 5B illustrate pixel delivery techniques that may be employed for the division of the display area shown in FIG. 4. In FIG. 5A, all pixels in middle region 406 are generated by GPU 204c and transferred by a Blt operation to pixel buffer 208b of card 202b prior to scanout. During scanout, control signal CTL (see FIG. 3) selects the internal pixel (i.e., the pixel from pixel buffer 208a) when lines 1 to $P_1$ (top portion 402 in FIG. 4) are being processed, thereby selecting pixels rendered by GPU 204a for top portion 402. When lines $P_1+1$ to N (middle portion 406 and bottom portion 404) are being processed, control signal CTL selects the external pixel (i.e., the pixel from pixel buffer 208b). Because the pixel data for lines $P_1+1$ to $P_2$ in pixel buffer 208b were transferred from card 202c, the pixels selected for middle portion 406 are those generated by GPU 204c; pixels selected for bottom portion 404 are those generated by GPU 204b.

In an alternative embodiment, all pixels rendered by GPU 208c are transferred to pixel buffer 208a of card 202a prior to scanout. During scanout, control signal CTL selects the internal pixel for lines 1 to $P_2$ and the external pixel for lines $P_2+1$ to N.

In FIG. 5B, pixels rendered by GPU 208c for a subregion 406a that includes lines $P_1$ to $P_3$ (where $P_1<P_3<P_2$) are transferred to pixel buffer 208a of card 202a while pixels rendered by GPU 208c for a subregion 406b that includes lines $P_3+1$ to $P_2$ are transferred to pixel buffer 208b of card 202b. During scanout, control signal CTL selects the internal pixel when lines 1 to $P_3$ (top portion 402 and subregion 406a) are being processed, and the external pixel when lines $P_3+1$ to N (subregion 406b and bottom portion 404) are being processed. Where $P_1$ and $P_2$ are dynamically adjustable, $P_3$ might also be dynamically adjusted according to a formula such as $P_3=P_1+f*(P_2-P_1)$ for a fixed fraction f; which might be, e.g., 0.5.

It is to be understood that the configurations of FIGS. 5A and 5B are illustrative and that other configurations are also possible. For example, the control signal CTL can select either candidate pixel on a per-scan-line or per-pixel basis, and the invention is not limited to instances where pixel buffer 208a (or 208b) supplies a contiguous group of pixels.

Data transfers between pixel buffer 208c and pixel buffer 208a or 208b are advantageously initiated by the graphics driver program, which writes data transfer commands into the rendering command stream for execution by one or another of the GPUs 204 at an appropriate time. For instance, where pixel buffers 208 are double buffered, the data transfer commands may be associated with flipping of the front and back frame buffers so that all portions of a newly rendered image appear on the display at the same time (i.e., in the same scanout pass).

Figure 6A:
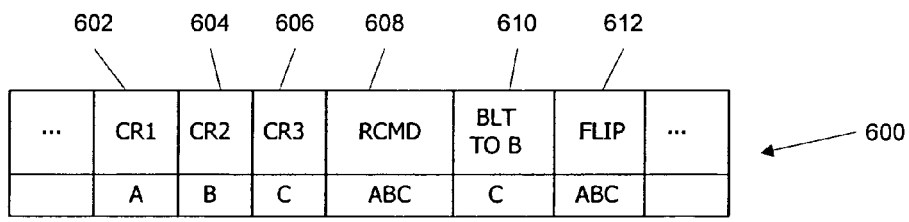
FIGS. 6A and 6B illustrate command streams for three-card graphics systems according to an embodiment of the present invention.

FIG. 6A illustrates a command stream 600 according to an embodiment of the present invention that results in GPU 204c transferring its pixel data for region 406 to buffer 208b as depicted in FIG. 5A. Below each command in stream 600 appears a sub-device mask in the form of one or more letters indicating which GPU(s) are to process that command; letters A, B and C denote GPUs 204a, 204b, and 204c respectively. It is to be understood that a sub-device mask need not use letters; bit masks or other suitable structures may be used to indicate which GPUs 204 are to process a particular command.

Clip rectangle commands "CR1" 602, "CR2" 604, and "CR3" 606 set a clip rectangle for each GPU 204. The sub-device masks cause each card to execute a different one of these three CR commands, thereby assigning each GPU 204 to render a different portion of display area 400. In this embodiment, CR1 sets the clip rectangle for GPU 204a to include lines 1 to $P_1$, CR2 sets the clip rectangle for GPU 204b to include lines $P_2+1$ to N, and CR3 sets the clip rectangle for card C to include lines $P_1+1$ to $P_2$. Values for $P_1$ and $P_2$ may be determined in accordance with adaptive load balancing techniques described above. In some embodiments, the clip rectangles might be set to overlap each other by a few lines in order to avoid edge-related artifacts; the proper pixel source for each line can be selected on scanout as described above.

"RCMD" at 608 represents a set of rendering commands for the image; these commands are executed by all cards. These commands may include various conventional transformations (e.g., modeling, lighting, viewing, perspective) as well as rasterization and shading commands. It is to be understood that any number and sequence of rendering commands may be issued and executed at this point in command stream 600. In the embodiment described herein, pixel buffers 208 are double-buffered, and GPUs 204 write pixel data generated in response to commands 608 to a back frame buffer while scanning out pixel data of a previous image from a front frame buffer.

Upon completion of commands 608, each GPU 204 has computed the pixel data for every pixel in its clip rectangle and has stored that pixel data in the back frame buffer of its respective pixel buffer 208. Thus, a new image is ready for display.

Next, a data transfer ("BLT to B") command 610 is issued with a sub-device mask specifying that only GPU 204c is to execute command 610. In some embodiments, BLT command 610 may include address parameters defining the block of memory locations in pixel buffer 208c to be transferred (i.e., the memory locations for region 406 shown in FIG. 5A) and/or a destination location in pixel buffer 208b. In other embodiments, this information may be provided in other ways, e.g., by programming a channel of a conventional DMA (direct memory access) controller or similar device, and execution of BLT command 610 by GPU 204c may include signaling the DMA controller to begin the DMA Blt operation. It should be noted that execution of BLT command 610 by GPU 204c occurs after GPU 204c has finished rendering its portion of the image. In some embodiments, GPU 204c transfers data only to portions of pixel buffer 208b to which GPU 204b is not writing data, and it is not required that execution of BLT command 610 be synchronized with completion of rendering commands 608 by GPU 204b.

Thereafter, "FLIP" command 612 is issued for execution by all GPUs 204. FLIP command 612 instructs each GPU 204 to swap its back and front frame buffers. In some embodiments, the buffer flips are advantageously synchronized among GPUs 204, e.g., using techniques described in above-referenced application Ser. No. 11/015,600.

The command stream of FIG. 6A may be modified or varied. For example, "BLT to B" command 610 could be replaced with a "BLT from C" command directed to GPU 204b by an appropriate sub-device mask, or the BLT command could transfer the data to pixel buffer 208a rather than 208b.

Figure 6B:
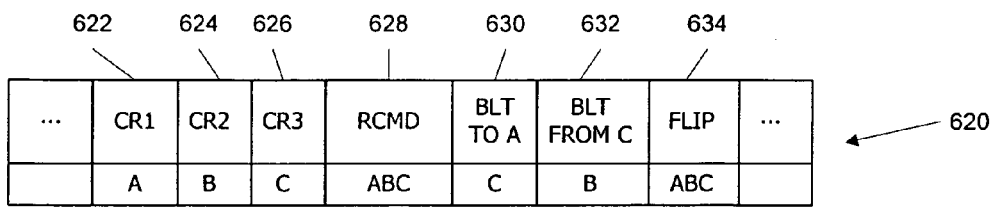

As another example, FIG. 6B illustrates an alternative command stream 620 according to an embodiment of the present invention that results in part of the pixel data for region 406 being transferred to pixel buffer 208b and the rest being transferred to pixel buffer 208a as depicted in FIG. 5B.

In command stream 620, CR commands 622, 624, 626 and the rendering commands (RCMD) 628 may be identical to the corresponding commands in command stream 600 of FIG. 6A described above. Upon completion of image rendering, "BLT to A" command 630 is directed to GPU 204c to initiate a "push" of the pixel data for subregion 406a (shown in FIG. 5B) from pixel buffer 208c to pixel buffer 208a, and "BLT from C" command 632 is directed to GPU 204b to initiate a "pull" of the pixel data for subregion 408b (FIG. 5B) from pixel buffer 208c to pixel buffer 208b. Variations of the BLT commands are possible; for example, data could be pushed to pixel buffer 208b and pulled from pixel buffer 208a, or both transfers could be implemented as pushes or pulls.

It should be noted that in some embodiments, execution of BLT commands 630 and 632 may overlap in time. In embodiments where pixel buffer 208c can accommodate multiple parallel data requests, this may result in increased speed of transferring the pixel data. If the respective data paths (on bus 113) from card 202c to card 202b and from card 202c to card 202a have different widths, $P_3$ can be selected such that both transfers require approximately equal time.

After completion of BLT commands 630, 632, a FLIP command 634, which may be identical to FLIP command 612 of FIG. 6A, is issued for execution. It will be appreciated that the command streams described herein are illustrative and that alternative implementations are possible.

Referring again to FIG. 2, allocation of the M lanes of bus 113 among cards 202a, 202b and 202c will now be described. As used herein, "card A" (card 202a in FIG. 2) refers to the card that is connected to display device 110, "card B" (card 202b) refers to the card that is connected to card A via pixel bus 212, and "card C" (card 202c) refers to a card that uses bus 113 to deliver its pixel data to another card for scanout; it is to be understood that labels A, B and C are independent of the physical arrangement of the cards or the location of any particular card on bus 113. As used herein, "allocation" of lanes includes any process by which values for the lane counts $M_A$, $M_B$, and $M_C$ indicated in FIG. 2 become determined.

In some embodiments, each connector location ("slot") on bus 113 is allotted a fixed number of lanes, which might be the same or different for different slots. In such embodiments, lanes can be allocated to a particular card in multicard subsystem 112 by deciding which card should function as card A (i.e., the card connected to the display device) and which of the other cards should function as card B (i.e., the card connected to card A by pixel bus 212).

Where different slots have different numbers of lanes, performance can be optimized by placing cards A, B, and C in appropriate slots. For many applications using subsystem 112, the dominant consumer of bandwidth on bus 113 is the transfer of pixel data for each newly rendered image from card C to card B and/or card A. Thus, it may be desirable to maximize the bandwidth available for these transfers. In one such embodiment, where M=20, the available slots for graphics cards 202 on bus 113 are a slot "0" that supports four lanes and slots "1" and "2" that each support eight lanes. Placing card A in slot 0 sets $M_A=4$, and placing cards B and C in slots 1 and 2 sets $M_B=M_C=8$. With this arrangement, card C can be programmed to transfer its pixel data to card B (at eight times the base rate) rather than to card A (at four times the base rate).

In another such embodiment, M=16, and slot "0" provides eight lanes while slots "1" and "2" each provide four lanes. In this case, placing card C in slot 0 sets $M_C=8$, and placing cards A and B in slots 1 and 2 sets $M_A=M_B=4$. With this arrangement card C can be programmed to transfer half its data to card B using four of its lanes and the other half to card A using the other four lanes. The effective bandwidth is at least four times the base rate, and if the data transfers can take place in parallel, the effective bandwidth is about eight times the base rate.

A related optimization technique involves using the data transfer configuration shown in FIG. 5B and adjusting $P_3$ for best performance. For instance, when $M_A$ and $M_B$ are equal, data transfers from card C to either of cards A and B happen at substantially the same rate, which suggests that the data delivered by card C should be equally divided among the two paths for optimal performance. Where $M_A$ and $M_B$ are not equal, data transfers to the different cards happen at different rates, and it becomes desirable to transfer more of the data over the faster path. Thus, in the formula $P_3=P_1+f^*(P_2-P_1)$ mentioned above, the fraction f might be adjusted to optimize data transfer performance. For example, if $M_B>M_A$, data transfers to card B are generally faster than data transfers to card A, and f<0.5 would be optimum, allowing more of the data to take the faster path. In general, the optimum value of f depends on the actual difference in the data transfer rate, and one skilled in the art will be able to work out an optimum value for a known set of rates. For a significant enough difference, f=0 could be the optimum point, in which case the configuration shown in FIG. 5B reduces to that shown in FIG. 5A.

In other embodiments, $M_A$, $M_B$ and $M_C$ might be configurable parameters, subject to the constraint that $M_A+M_B+M_C=M$, where M is constant, rather than being determined by particular bus slots. For example, in an embodiment using PCI-E, lane allocations for various devices connected to the bus are negotiated during system power-up. The lane allocations are stored and later read by the device driver during driver initialization. In this case the bandwidth from card C to cards A and B can be maximized subject to any constraints imposed by the need to use bus 113 to deliver input data to cards A, B and C.

In still another embodiment, pixel bus 212 might be omitted entirely. In this embodiment, cards 202b and 202c would both transfer their pixel data via bus 113 to card 202a for scanout. In this embodiment, the lane allocation advantageously maximizes the number of lanes available for providing data to card 202a. For example, suppose that M=16, and slot "0" provides eight lanes while slots "1" and "2" each provide four lanes. In this case, placing card 202a in slot 0 sets $M_A=8$, and placing cards 202b and 202c in slots 1 and 2 sets $M_B=M_C=4$. With this arrangement card 202a can be programmed to pull pixel data from card 202b using four lanes while card 202c can be programmed to push pixel data to card 202a using a different four lanes, for an effective bandwidth of four to eight times the base rate.

Figure 7:
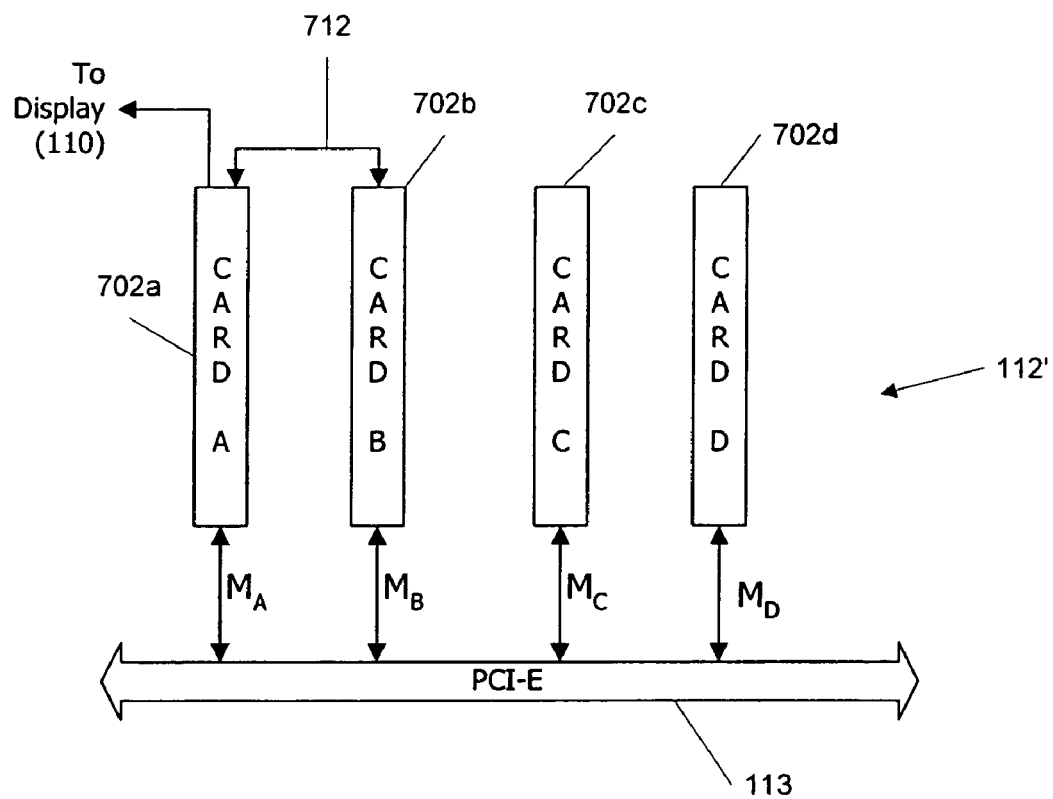
FIG. 7 is a block diagram of an alternative embodiment of a multicard graphics processing subsystem with four graphics cards according to an embodiment of the present invention.

The present invention is not limited to three-card systems such as that shown in FIG. 2 but can be extended to systems with any larger number of cards. For example, FIG. 7 is a block diagram of an alternative embodiment of a graphics processing subsystem 112' with four graphics cards 702 connected to bus 113. Each of cards 702 may be generally similar to cards 202 of FIG. 2 and may include a graphics processor, pixel buffer, command buffer and so on, as well as the pixel selection path shown in FIG. 3.

Card 702a is connected to display device 110 and delivers pixel data thereto. Card 702b is connected to card 702a by a pixel bus 712 that may be generally similar to pixel bus 212 of FIG. 2. Cards 702c and 702d, which are not connected to any other cards by a pixel bus, transfer their pixel data via bus 113 to cards 702a and 702b for scanout. To reduce bus contention, one of cards 702c and 702d advantageously transfers its data to one of cards 702a and 702b while the other transfers its data to the other of cards 702a and 702b.

Figure 8:
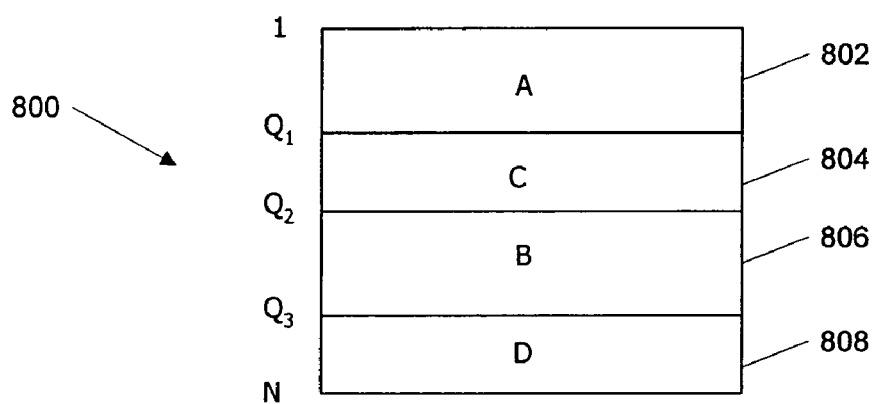
FIG. 8 illustrates a display area in which an image is to be generated using four-way SFR according to an embodiment of the present invention.

Subsystem 112' advantageously implements SFR. By way of example, FIG. 8 illustrates a display area 800 in which an image is to be generated using four-way SFR. Like display area 400 of FIG. 4, display area 800 represents a pixel array consisting of some number N of scan lines, each of which includes some number of pixels. Letter "A" denotes that the GPU of card 702a computes pixel data for a top portion 802 (scan lines 1 to $Q_1$) of display area 400, letter "C" that the GPU of card 702c computes pixel data for an upper middle portion 804 (scan lines $Q_1+1$ to $Q_2$), letter "B" that the GPU of card 702b computes pixel data for a lower middle portion 806 (scan lines $Q_2+1$ to $Q_3$), and letter "D" that the GPU of card 702d computes pixel data for a bottom portion 608 (scan lines $Q_3+1$ to N). In some embodiments, the values of $Q_1$, $Q_2$ and $Q_3$ can be dynamically adjusted as long as $1<Q_1<Q_2<Q_3<N$, and adaptive load balancing may be used, e.g., as described in above-referenced application Ser. No. 10/642,905. Other divisions and permutations of assignments of GPUs to image portions may be substituted.

Figure 9:
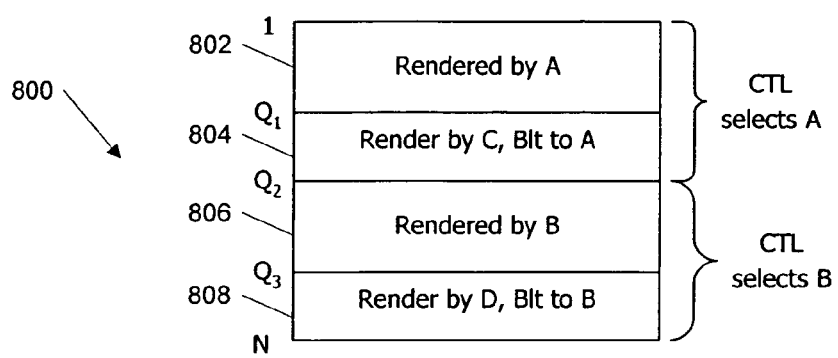
FIG. 9 illustrates a pixel delivery technique that may be employed in an embodiment of the present invention where the display area is divided as shown in FIG. 8.

FIG. 9 illustrates a pixel delivery technique that may be employed for the division of the display area shown in FIG. 8. All pixels in upper middle region 804 are generated by the GPU of card 702c and transferred via bus 113 to the pixel buffer of card 702a prior to scanout. Similarly, all pixels in lower middle region 806 are generated by the GPU of card 702d and transferred via bus 113 to the pixel buffer of card 702b prior to scanout. During scanout, control signal CTL (see FIG. 3) selects the internal pixel (i.e., the pixel from the pixel buffer of card 702a) when lines 1 to $Q_2$ are being processed, thereby selecting pixels rendered by the GPU of card 702a for top region 802 and pixels rendered by the GPU of card 702c for upper middle region 804. When lines $Q_2+1$ to N are being processed, control signal CTL selects the external pixel (i.e., the pixel rendered by the GPU of card 702b for lower middle region 806 and the pixel rendered by the GPU of card 702d for bottom region 808).

Figure 10:
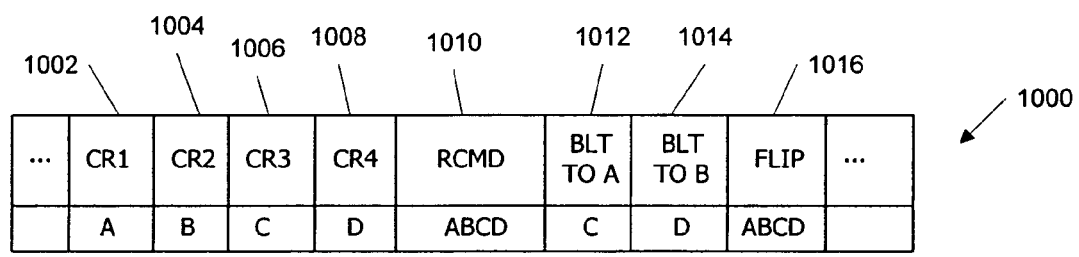
FIG. 10 illustrates a command stream for a four-card graphics system according to an embodiment of the present invention.

FIG. 10 illustrates a command stream 1000 that results in card 702c transferring its pixel data for region 804 to card 702a and card 702d transferring its pixel data for region 808 to card 702b as depicted in FIG. 9. Command stream 1000 is generally similar to command stream 600 of FIG. 6A described above. Four clip rectangle (CR) commands are provided to set a different clip rectangle for each of the four GPUs; these commands may be similar to commands 602, 604 and 606 of FIG. 6A. Rendering commands (RCMD) 1010 are issued for execution by all four GPUs and result in each GPU rendering its assigned portion of the image.

Thereafter, "BLT to A" command 1012 and "BLT to B" command 1014 are issued for execution by the GPUs of card 702c and 702d, respectively. In other embodiments, one or both of these "push" commands may be replaced by a "pull" command to the GPU of the receiving card 702a or 702b. Execution of BLT commands 1012 and 1014 may overlap in time. After completion of BLT commands 1012, 1014, a FLIP command 1016, which may be identical to FLIP command 612 of FIG. 6A, is issued for execution.

Lane allocation in the four-card system 112' is subject to similar considerations to those described above. In one embodiment, the available slots for graphics cards 702 on bus 113 are slots "0" and "1" that each support four lanes and slots "2" and "3" that each support eight lanes. In this embodiment, one optimal allocation would be to place cards A and C in slots 0 and 1, resulting in $M_A=M_C=4$ and to place cards B and D in slots 2 and 3, resulting in $M_B=M_D=8$. The transfer from card B to card D can occur at eight times the base rate, while the transfer from card A to card C occurs at four times the base rate. While the two transfer rate are not equal, the data transfer performance can be optimized using adaptive load balancing to adjust $Q_1$, $Q_2$ and $Q_3$ (see FIG. 9).

Figure 11:
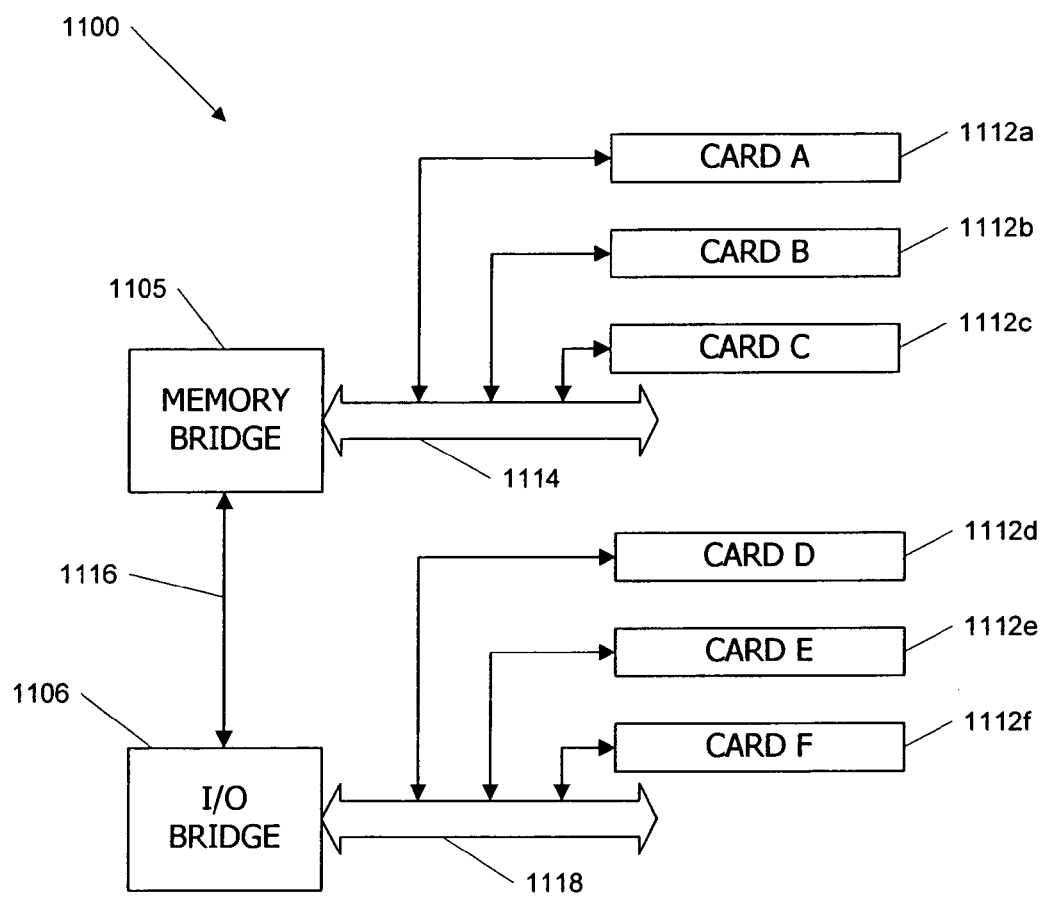
FIG. 11 is a block diagram of a multicard graphics processing subsystem with six graphics cards according to an embodiment of the present invention.

More generally, any number of graphics devices may be connected to a PCI-E bus. The devices might all be connected to the same bridge (e.g., as shown in FIG. 1), or different devices might be connected to different bridges. For example, FIG. 11 shows a system 1100 with a memory bridge 1105 and an I/O bridge 1106. These bridges may be generally similar to bridges 105 and 106 of FIG. 1; for instance, memory bridge 1105 may be coupled to a CPU and system memory (not shown in FIG. 11) while I/O bridge 1106 is coupled to disk drives and user input devices (also not shown in FIG. 11). In system 1100, three graphics cards 1112a, 1112b, 1112c are coupled to memory bridge 1105 while three other graphics cards 1112d, 1112e, 1112f are coupled to I/O bridge 1106. All six graphics cards 1112a-1112f can intercommunicate via bus segments 1114, 1116, and 1118. Any number of graphics cards may be connected to each bridge, and a computer system may include any number of bridges. Thus, embodiments of the present invention may include any number of cards, not limited to three or four, and data may be transferred between cards using any combination of bus paths and dedicated interfaces.

While the invention has been described with respect to specific embodiments, one skilled in the art will recognize that numerous modifications are possible. For instance, while systems including three and four graphics cards have been described, any number of cards might be used. A single card may include multiple GPUs that cooperate to render the portion of the image assigned to that card, and some or all of the GPUs on a card might share memory devices. Where one card has multiple GPUs, sub-device masks may be used to individually address the individual GPUs or all GPUs on a card as desired. The various GPUs may be implemented using any suitable technologies, e.g., as one or more integrated circuit devices, and different GPUs or graphics cards might or might not be identical in structure, capabilities, and operation.

Each GPU advantageously has some memory associated therewith for storing pixel data and commands (and optionally other data). This memory may be provided in one or more memory chips connected to the GPU, in memory circuits integrated with the GPU, or in a shared memory resource that is logically dedicated to the GPU (e.g., a region of system memory).

In some embodiments, a multicard graphics processing subsystem may also be operable in an "independent rendering" mode in which different graphics cards may render images for different display devices. In such cases, the images rendered by different graphics cards might or might not be related to each other (e.g., based on the same scene data). Some multicard graphics processing subsystem may be configurable to operate in independent rendering, distributed rendering or other modes. For example, some cards may cooperate in distributed rendering mode to generate images for a first display device while another card operates independently to generate images for a second display device.

Interconnection between the cards may also be modified. For instance, a graphics bridge unit, which can be in a separate chip or integrated with one of the GPUs, can receive incoming data from the bus and distribute it appropriately (e.g., to all GPUs or cards, or just to those GPUs or cards identified by the sub-device mask). Another bridge unit might be provided to manage selection among candidate pixels during scanout.

Various bus protocols may be used to connect the graphics cards to the rest of a computer system. While PCI-E is specifically mentioned herein, other bus architectures may also be used. Preferred bus architectures support high speed transfers of blocks of data between connected devices and might or might not provide configurable lane allocations.

Further, while the foregoing description refers to graphics cards, the present invention is not limited to graphics devices that are implemented as expansion cards. Accordingly, the term "graphics device" is used herein to refer to any computer system component that provides a GPU (or multiple GPUs) plus some physically or logically dedicated memory and that is connectable, as a distinct device, to a bus. A graphics device may be, e.g., an expansion card with one or more GPUs mounted thereon, a graphics processor mounted directly on a system motherboard, a graphics processor integrated into a system chipset component (e.g., into the memory bridge chip 105 shown in FIG. 1), or the like, as long as the graphics device is capable of operating as a distinct bus device on a suitable bus. Scanout modules and pixel selection logic may be integrated with a GPU or provided on a separate chip as part of a graphics device and may be implemented, e.g., using one or more ASICs, programmable processor elements, other integrated circuit technologies, or any combination thereof.

In addition, graphics processing subsystems embodying the present invention may be incorporated into a variety of devices, including general purpose computer systems, video game consoles and other special purpose computer systems, DVD players, handheld devices such as mobile phones or personal digital assistants, and so on. Moreover, it is not required that the graphics processing system is used to deliver pixel data to a display device; the processing power of the multicard graphics system may also be harnessed for general-purpose applications.

Thus, although the invention has been described with respect to specific embodiments, it will be appreciated that the invention is intended to cover all modifications and equivalents within the scope of the following claims.

What is claimed is:

1. A graphics processing subsystem comprising:
at least three graphics devices each adapted to be coupled to a system bus, the graphics devices including:
a first graphics device configured to compute pixel data for a first portion of an image, wherein the first graphics device includes a pixel buffer configured to accept multiple parallel data requests;
a second graphics device configured to compute pixel data for a second portion of the image; and
a third graphics device configured to compute pixel data for a third portion of the image,
wherein the first graphics device is further configured to supply pixel data from either of the first or second graphics devices to a display device,
wherein the first, second, and third graphics devices are further configured such that the pixel data for the second and third portions of the image are transferred from the second and third graphics devices to the first graphics device via the system bus;
wherein a size of the second portion of the image is determined at least in part by bandwidth of a first system bus connection between the second graphics device and the first graphics device,
wherein a size of the third portion of the image is determined at least in part by bandwidth of a second system bus connection between the third graphics device and the first graphics device, and
wherein the pixel data for the second portion of the image and the pixel data for the third portion of the image are communicated to the pixel buffer of the first graphics device in parallel.

2. The graphics processing subsystem of claim 1 wherein the system bus has a plurality of lanes for transferring data and wherein a fixed number M of the plurality of lanes of the system bus are allocated to the graphics processing subsystem, and
wherein the M lanes are further allocated among the at least three graphics devices such that a data transfer path on the system bus between the third graphics device and the first graphics device and a data transfer path on the system bus between the second graphics device and the first graphics device each include the same number of lanes.

3. The graphics processing subsystem of claim 1 wherein:
the third graphics device is further configured to transfer, by a push operation, the pixel data for the third portion of the image to the second graphics device; and
the first graphics device is further configured to transfer, by a pull operation, the pixel data for the second portion of the image from the second graphics device to the first graphics device.

* * * * *